US011376790B2

(12) United States Patent
Costabeber et al.

(10) Patent No.: US 11,376,790 B2
(45) Date of Patent: Jul. 5, 2022

(54) CARTRIDGE FOR A STEREOLITHOGRAPHIC MACHINE

(71) Applicant: DWS s.r.l., Thiene (IT)

(72) Inventors: Ettore Maurizio Costabeber, Zane' (IT); Renzo Busato, Marano Vicentino (IT)

(73) Assignee: DSW S.R.L., Thiene (IT)

( * ) Notice: Subject to any disclaimer, the term of this patent is extended or adjusted under 35 U.S.C. 154(b) by 242 days.

(21) Appl. No.: 16/763,296

(22) PCT Filed: Nov. 12, 2018

(86) PCT No.: PCT/IB2018/058858
§ 371 (c)(1),
(2) Date: May 12, 2020

(87) PCT Pub. No.: WO2019/097385
PCT Pub. Date: May 23, 2019

(65) Prior Publication Data
US 2020/0307089 A1 Oct. 1, 2020

(30) Foreign Application Priority Data
Nov. 14, 2017 (IT) .......................... 102017000129499

(51) Int. Cl.
*B29C 64/255* (2017.01)
*B29C 64/321* (2017.01)
(Continued)

(52) U.S. Cl.
CPC .......... *B29C 64/255* (2017.08); *B29C 64/124* (2017.08); *B29C 64/321* (2017.08); *B29C 64/343* (2017.08); *B33Y 30/00* (2014.12)

(58) Field of Classification Search
None
See application file for complete search history.

(56) References Cited

U.S. PATENT DOCUMENTS

| 2016/0288421 | A1  | 10/2016 | Costabeber |          |
|--------------|-----|---------|------------|----------|
| 2017/0050389 | A1* | 2/2017  | Lee ........................ | B29C 64/357 |
| 2021/0023787 | A1* | 1/2021  | Busato .................. | B29C 64/264 |

FOREIGN PATENT DOCUMENTS

| IT | 201700015055 A1 | 8/2018 |
| JP | 2948893 B2 | 9/1999 |
| WO | 2018146568 A1 | 8/2018 |

* cited by examiner

*Primary Examiner* — Matthew J Daniels
*Assistant Examiner* — Paul Spiel
(74) *Attorney, Agent, or Firm* — Volpe Koenig

(57) ABSTRACT

A cartridge for a stereolithographic machine, includes a body, which in turn, includes a container, delimited by walls, having a bottom, and an opposite access opening allowing access inside the container, inlet and outlet mouths for a photopolymerisable material, at least one tank for same. The tank includes a transit opening for a photopolymerisable material and an air passage opening communicating with the environment; and includes: circulation means to circulate the photopolymerisable material between the outlet mouth and the inlet mouth of the container. Between the circulation means and the inlet and outlet mouths, and between the circulation means and the transit and air passage openings, valve means are interposed, configured to alternatively allow various circulation configurations of the cartridge, either preventing or allowing passage of photopolymerisable material between the container and the tank; or allowing the passage of material between the outlet and inlet mouths of the same container.

15 Claims, 5 Drawing Sheets

(51) Int. Cl.
*B29C 64/124* (2017.01)
*B29C 64/343* (2017.01)
*B33Y 30/00* (2015.01)

CARTRIDGE FOR A STEREOLITHOGRAPHIC MACHINE

The present invention relates to a cartridge for a stereolithographic machine. As is known, the stereolithographic technique envisages making a three-dimensional object by superimposing a plurality of layers of a liquid or pasty photopolymerisable material, which is solidified by exposure to predefined radiation, generally light.

One known type of stereolithographic machine comprises a container for containing the material and a modelling platform motorised in a vertical direction.

The machine further comprises emitting means for emitting the aforesaid predefined radiation, which are able to selectively solidify a layer of the material adjacent to the modelling platform.

Several photopolymerisable stereolithography materials are known which can be used to make the object, which mutually differ in colour, tonality, mechanical characteristics and other physical parameters.

A same stereolithographic machine can be used with any one of the different materials mentioned above, according to the requirements requested for each three-dimensional object to be made.

In US patent application US 2016/0288421 A1 a cartridge is described for a stereolithographic machine, comprising: a container provided with an access opening and a transparent bottom opposite the access opening, a tank for containing a base liquid or pasty material, irremovably associated with the container, and valve means for the passage of the base material from the tank to the container.

In this cartridge the valve means are configured to open when the difference between the pressure present in the tank and that present in the container is at least equal to a predefined value and to spontaneously close again when the pressure difference is lower than the predefined value; the tank comprises sealing means for the connection to an external air supply device.

In particular, during the execution of the stereolithographic process for the creation of a three-dimensional object, the need to refill the photopolymerisable material present in the container is known, so as to maintain its level constant. The refilling of the photopolymerisable material in the container where stereolithography is performed can be carried out automatically, providing the stereolithographic machine with a feeding device.

For example, Italian patent application no. 102017000015055 describes a cartridge for a stereolithography machine with an inclined tank, comprising a box-like body inside which a container and at least one tank for a photopolymerisable material are defined; the container is delimited by a containment wall, which has a bottom that is at least in part transparent, and an opposite access opening adapted to allow access inside the container; this container has an inlet mouth for introducing a photopolymerisable material and an outlet mouth for the release of the photopolymerisable material from the container.

The known cartridge also comprises:
means for the transfer of a photopolymerisable material from the tank to the container, which are embodied in a plunger system,
and means for the recirculation of a photopolymerisable material from the outlet mouth towards the inlet mouth of the container, which are embodied in a peristaltic-type pumping system.

Although this cartridge allows automatically refilling of photopolymerisable material and its recirculation, it has some perfectible aspects.

A first of these perfectible aspects resides in the relative complexity of components and construction of such known cartridge.

For example, this cartridge comprises both specific means for recirculating the photopolymerisable material, and specific means for transferring the photopolymerisable material from the tank to the container.

The preparation of both of these different means involves a certain burden in terms of components, assembly and actuator devices, since both of the aforementioned means require dedicated actuators for their operation.

Another limitation of the known cartridges is linked to the fact that if the photopolymerisable material transferred from the tank to the container for stereolithography operations is not completely used and remains in the container, it risks degrading and losing more or less important characteristics which are useful for its optimal use.

The aim of the present invention is to provide a cartridge for a stereolithographic machine capable of obviating the aforementioned drawbacks and limitations of the prior art.

In particular, an object of the invention is to provide a compact cartridge which is easier to manufacture and assemble than the known cartridges.

Another object of the invention is to provide a cartridge that allows for better preservation of the unused photopolymerisable material.

The aforesaid task and the aforementioned objects are achieved by a cartridge for a stereolithographic machine with an inclined tank according to claim 1.

Further characteristics of the cartridge according to claim 1 are described in the dependent claims.

The aforesaid task and objects, together with the advantages that will be mentioned hereinafter, are hereinafter indicated by the description of an embodiment of the invention, which is given by way of non-limiting example with reference to the attached drawings, where:

Figure 1:
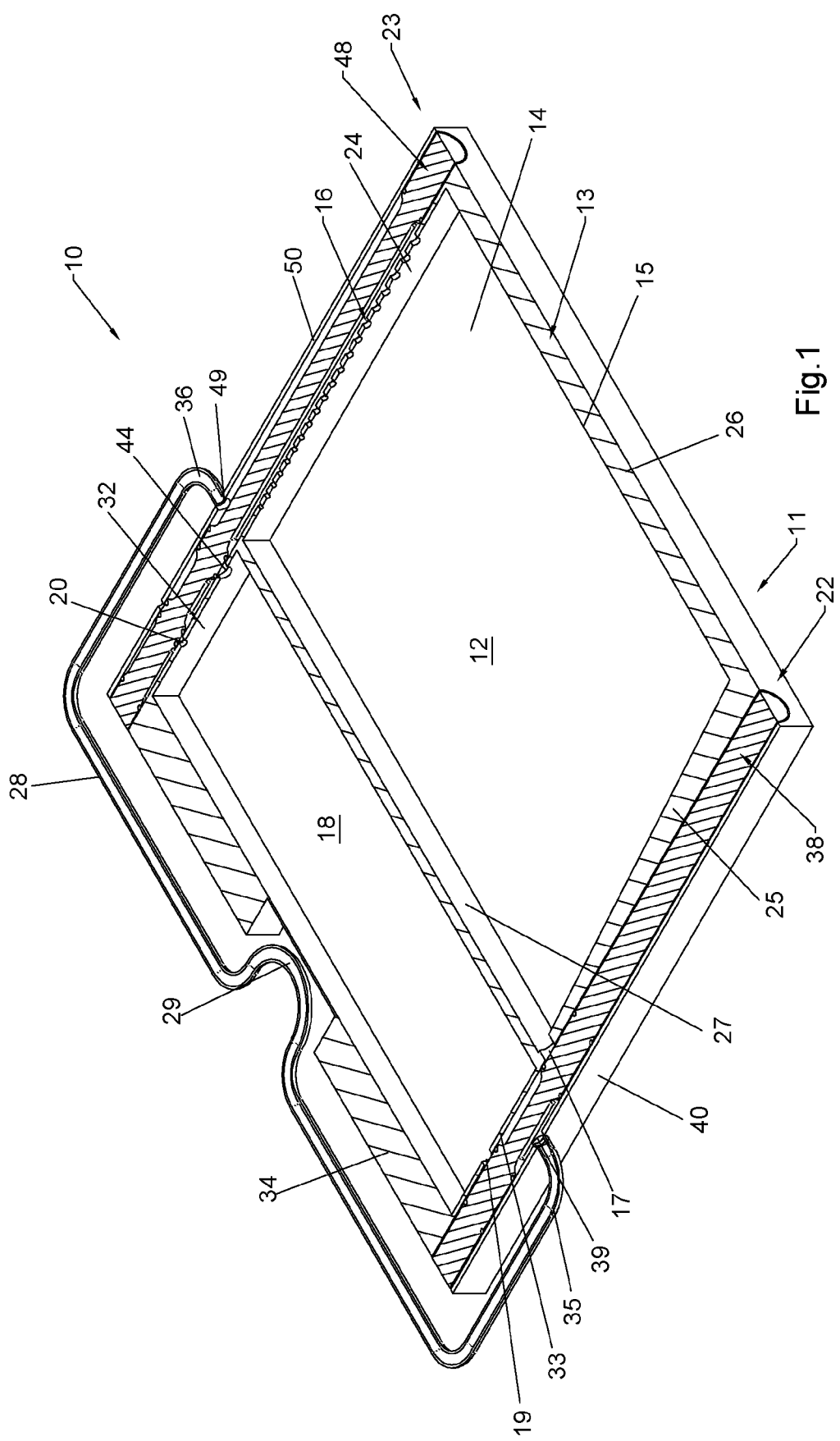
FIG. 1 is a perspective cut-away view of a cartridge according to the invention.

With reference to the aforementioned figures, a cartridge for a stereolithographic machine according to the invention is comprehensively indicated with the number 10.

This cartridge 10 comprises:
a box-like body 11 comprising in turn:
a container 12, delimited by containment walls 13, having a bottom 14, at least part of which is transparent, and an opposite access opening 15, adapted to allow access inside the container 12, an inlet mouth 16, for the introduction of a photopolymerisable material, and an outlet mouth 17 for the photopolymerisable material to exit from the container 12;
a tank 18 for a photopolymerisable material, comprising a transit opening 19 for the photopolymerisable material and an air passage opening 20, communicating with the environment.

This cartridge 10 also comprises circulation means 21, for the circulation of a photopolymerisable material between the outlet mouth 17 and the inlet mouth 16 of the container 12.

The cartridge 10 according to the present invention is characterised by the fact that between the circulation means 21 and the inlet 16 and outlet 17 mouths, and between the circulation means 21 and transit 19 and air passage 20 openings, valve means 22 and 23 are interposed as better described below, and configured to alternatively allow the following use configurations of the same cartridge 10:
- a first configuration, shown in FIG. 2, for preventing the passage of photopolymerisable material between the container 12 and the tank 18;
- a second configuration, shown in FIG. 3, allowing the passage of photopolymerisable material between the tank 18 and the container 12;
- a third configuration, shown in FIG. 4, of circulation for the photopolymerisable material, allowing the passage of photopolymerisable material between the outlet mouth 17 of the container 12 and the inlet mouth 16 of the same container 12.

In particular, in the embodiment described herein of the cartridge 10 according to the invention, but not limiting to the invention itself, the valve means 22 and 23 are configured to allow:
- a second configuration allowing the passage of photopolymerisable material from the tank 18 towards the container 12;
- a third configuration allowing the passage of photopolymerisable material from the outlet mouth 17 of the container 12 towards the inlet mouth 16 of the same container 12.

Still in particular, in the present embodiment which is exemplary but non-limiting to the invention, the valve means 22 and 23 are configured to allow a fourth use configuration of the cartridge 10, allowing the passage of photopolymerisable material from the container 12 towards the tank 18.

In the embodiment of the invention described herein, the perimeter containment walls 13 of the container 12 comprise a first wall 24, on which the inlet mouth 16 is defined, an opposite second wall 25, on which the outlet mouth 17 is defined, and two side walls 26 and 27.

When the cartridge 10 is positioned in a position of use on a stereolithography machine with an inclined tank, the first wall 24 is placed at a greater height than the second wall 25, with respect to a horizontal reference plane.

The tank 18 in turn also comprises a first wall 32, on which the air passage opening 20 is defined, an opposite second wall 33, on which the transit opening 19 is defined, and two side walls 34 and 27.

The container 12 and the tank 18 are therefore separated by a wall, in the present embodiment this is wall 27, which is shared between the two.

The circulation means 21 comprise a shaped tube 28.

A section 29 of this shaped tube 28 is configured to surround at least in part a compression rotor 30, defining with it a peristaltic pumping system 31.

The compression rotor 30 and the peristaltic pumping system 31 are intended to be of a type known per se.

This section 29 is elastically deformable.

The shaped tube 28 has a first end 35 and a second opposite end 36.

The valve means 22 and 23 comprise a first valve 22 configured to alternatively determine the following configurations:
- a first configuration of the first valve 22, for the simultaneous closing of the transit opening 19 of the tank 18 and of the outlet mouth 17 of the container 12, for the first use configuration of the cartridge 10;
- a second configuration of the first valve 22, connecting the first end 35 of the shaped tube 28 of the circulation means 21 and the transit opening 19 of the tank 18, with the simultaneous closing of the outlet mouth 17 of the container 12, for the second use configuration of the cartridge 10;
- a third configuration of the first valve 22, connecting the first end 35 of the shaped tube 28 of the circulation means 21 and the outlet mouth 17 of the container 12, with the simultaneous closing of the transit opening 19 of the tank 18, for the third use configuration of the cartridge 10.

The first valve 22 is configured in such a way that its third configuration, connecting the first end 35 of the shaped tube 28 of the circulation means 21 and the outlet mouth 17 of the container 12, with the simultaneous closing of the transit opening 19 of the tank 18, cooperates in the fourth use configuration of the cartridge 10.

This first valve 22 is defined by a three-way valve with three positions.

In the embodiment of the invention described herein by way of non-limiting example of the invention itself, this first valve 22 consists of a slide-type valve. In particular, the first valve 22 comprises a tubular channel 37 in which a shaped slider rod 38 slides.

The tubular channel 37 extends in a straight line.

This tubular channel 37 is defined adjacent to the second wall 25 of the container 12 and to the second wall 33 of the tank 18.

The outlet mouth 17 of the container 12 and the transit opening 19 of the tank 18 are open on this tubular channel 37.

In the present embodiment, the tubular channel 37 is defined within the same box-like body 11, adjacent to the second walls 25 and 33.

The tubular channel 37 is positioned between these second walls 25 and 33 and a corresponding opposite perimeter wall 40 of the box-like body 11.

The tubular channel 37 is connected to the first end 35 of the shaped tube 28 by a side through hole 39 defined on the perimeter wall 40.

The shaped slider rod 38 of the first valve 22 comprises two blocking sections 41 and 42 and a transit section 43, interposed between the blocking sections 41 and 42.

The shaped slider rod 38 has a main extension axis X1.

With respect to this extension axis X1, the side through hole 39 is located on the perimeter wall 40, between the transit opening 19 and the outlet mouth 17. The transit section 43 consists of a section of transversal dimensions, with respect to the axis X1, smaller than the corresponding transversal dimensions of the blocking sections 41 and 42, so that between this transit section 43 and the section of the tubular channel 37 occupied by the same, an annular conduit 74 is defined.

This transit section 43 extends in the direction of the axis X1 for a length such to put in communication the side through hole 39 with the transit opening 19 of the tank 18 when the shaped slider rod 38 is in the second use configuration, and the side through hole 39 with the outlet mouth 17 of the container 12 in the third use configuration.

This transit section 43 extends in the direction of the axis X1 for a length shorter than the minimum distance between the outlet mouth 17 and the transit opening 19, so that they are never in communication via the transit section 43. This transit section 43 is delimited in the direction of the axis X1 by two opposite sealing rings 71 and 72.

A first blocking section 41 is comprised between two sealing rings 70 and 71. This first blocking section 41 extends along the axis X1 for a length that completely obstructs the outlet mouth 17 both when the first valve 22 is in its first use configuration, with the simultaneous closing of the transit opening 19 of the tank 18, and when the first valve 22 is in its second use configuration, with the first end 35 of the shaped tube 28 in connection with the transit opening 19 of the tank 18 through the transit section 43.

A second blocking section 42 is comprised between two sealing rings 72 and 73.

This second blocking section 42 extends along the axis X1 for a length that completely obstructs the outlet mouth 17 both when the first valve 22 is in its first use configuration, with the simultaneous closing of the outlet mouth 17 of the container 12, and when the first valve 22 is in its third use configuration, with the first end 35 of the shaped tube 28 in connection with the outlet mouth 17 of the container 12 through the transit section 43.

The shaped slider rod 38 has two opposite end sections 85 and 86, respectively.

These end sections 85 and 86 are respectively contiguous to the first 41 and second 42 blocking sections, and obviously externally to the latter.

These end sections 85 and 86 are available for connection with an actuator for the translation of the same shaped slider rod 38 and therefore for the operation of the first valve 22.

In the particular embodiment described herein of the cartridge 10 according to the invention, the tank 18 comprises an auxiliary opening 44 for the passage of photopolymerisable material during the fourth use configuration of the cartridge 10, allowing the passage of photopolymerisable material from the container 12 to the tank 18.

The valve means 22 and 23 comprise a second valve 23 configured to alternatively determine the following configurations:
 a first configuration of the second valve 23 for the simultaneous closing of the air passage opening 20 and the auxiliary opening 44 of the tank 18, for the first use configuration of the cartridge 10;
 a second configuration of the second valve 23 of connection between the second end 36 of the shaped tube 28 of the circulation means 21 and the inlet mouth 16 of the container 12, with the simultaneous opening of the air passage opening 20 of the tank 18, for the second use configuration and the third use configuration of the cartridge 10.

This second valve 23 is configured to determine, alternatively to its first configuration and second configuration, a third configuration connecting the second end 36 of the shaped tube 28 of the circulation means 21 and the auxiliary opening 44 of the tank 18, with the simultaneous opening of the air passage opening 20 and the simultaneous closing of the inlet mouth 16 of the container 12, cooperating in the fourth use configuration of the cartridge 10.

This second valve 23 is defined by a five-way valve with three positions.

In the embodiment of the invention described herein by way of non-limiting example of the invention itself, this second valve 23 consists of a slide-type valve.

In particular, the second valve 23 comprises a tubular channel 47 in which a shaped slider rod 48 slides.

The tubular channel 47 extends in a straight line.

This tubular channel 47 is defined adjacent to the first wall 24 of the container 12 and the first wall 32 of the tank 18.

The inlet mouth 16 of the container 12, the air passage opening 20 and the auxiliary opening 44 of the tank 18 open directly on this tubular channel 47.

In the present embodiment, the tubular channel 47 is defined within the same box-like body 11, adjacent to the first walls 24 and 32.

The tubular channel 47 is positioned between these first walls 24 and 32 and a corresponding opposite perimeter wall 50 of the box-like body 11.

The tubular channel 47 is connected to the second end 36 of the shaped tube 28 through a side through hole 49 defined on the perimeter wall 50.

The shaped slider rod 48 of the second valve 23 comprises four blocking sections 51, 52, 53 and 54 and three transit sections 55, 56 and 57, each interposed between two blocking sections 51, 52, 53 and 54.

The shaped slider rod 48 has a main extension axis X2.

In a preferred embodiment of the cartridge 10, this axis X2 is parallel to the axis X1 of the first valve 22.

With respect to this extension axis X2, the side through hole 49 is located on the perimeter wall 50, between the inlet mouth 16 and the auxiliary opening 44. A first transit section 55 consists of a section of transversal dimensions, with respect to the axis X2, smaller than the corresponding transversal dimensions of the blocking sections 51, 52, 53, 54, so that between this first transit section 55 and the section of the tubular channel 47 occupied by the same, an annular conduit 75 is defined.

This first transit section 55 extends in the direction of the axis X2 for a length such to put the side through hole 49 in communication with the inlet mouth 16 of the container 12 when the shaped slider rod 48 is in the second use configuration of the second valve 23.

This first transit section 55 is interposed between a first blocking section 51, outermost and comprising a first end of the shaped slider rod 48, and a second blocking section 52.

This first transit section 55 is delimited in the direction of the axis X2 by two opposite sealing rings 77 and 78.

A second transit section 56 consists of a section of transversal dimensions, with respect to the axis X2, smaller than the corresponding transversal dimensions of the blocking sections 51, 52, 53, 54, so that between this second transit section 56 and the section of the tubular channel 47 occupied by the same, an annular conduit 76 is defined.

This second transit section 56 extends in the direction of the axis X2 for a length such to put the side through hole 49 in communication with the auxiliary opening 44 of the tank 18 when the shaped slider rod 48 is in the third use configuration of the second valve 23.

This second transit section 56 is interposed between the second blocking section 52 and a third blocking section 53.

This second transit section 56 is delimited in the direction of the axis X2 by two opposite sealing rings 79 and 80.

A third transit section 57 consists of a section of transversal dimensions, with respect to the axis X2, smaller than the corresponding transversal dimensions of the blocking sections 51, 52, 53, 54, so that between this third transit section 57 and the section of the tubular channel 47 occupied by the same, an annular conduit 81 is defined.

This third transit section 57 extends in the direction of the axis X2 for a length such to put the air passage opening 20 of the tank 18 in communication with an external air passage hole 82, open to the outside, defined on the perimeter wall 50, when the shaped slider rod 48 is in the second use configuration and in the third use configuration of the second valve 23.

This third transit section 57 is interposed between the third blocking section 53 and a fourth blocking section 54, outermost and comprising a second end, opposite to the first end, of the shaped slider rod 48.

This third transit section 57 is delimited in the direction of the axis X2 by two opposite sealing rings 83 and 84.

The second blocking section 52 is therefore comprised between two sealing rings 78 and 79.

This second blocking section 52 extends along the axis X2 for a length such to obstruct the auxiliary opening 44 when the second valve 23 is in its first use configuration, with the simultaneous closing of the air passage opening 20 by the third blocking section 53.

The third blocking section 53 is comprised between two sealing rings 80 and 83.

This third blocking section 53 extends along the axis X2 for a length such to obstruct the air passage opening 20 and the air passage hole 82 when the second valve 23 is in its first use configuration, and such to at least partially open the air passage opening 20 and the air passage hole 82 both when the second valve 23 is in its second use configuration, and when the second valve 23 is in its third use configuration.

The first 51 and fourth 54 blocking sections, being positioned at opposite ends of the shaped slider rod 48, can connect to an actuator for the translation of the same shaped slider rod 48 and therefore for the operation of the second valve 23.

In the present embodiment of a cartridge 10 according to the invention, the inlet mouth 16 for the introduction of a photopolymerisable material is constituted by a plurality of inlet through holes, of which three holes 16a, 16b, 16c are indicated in the figures by way of example, defined in a row along the first wall 24 of the container 12, so as to substantially occupy this first wall 24 throughout its length.

These inlet holes 16a, 16b, 16c have a diameter which increases starting from a first hole with a smaller diameter 16a, which is closest to the side through hole 49 of connection with the shaped tube 28 of the circulation means 21, towards a last, opposite inlet hole 16z with the largest diameter.

Thanks to this inlet mouth 16, a better distribution of the photopolymerisable material entering the container 12 is obtained, since the increasing diameter inlet holes allow the progressive filling of the tubular conduit 75 little by little as the photopolymerisable material enters the shaped conduit 28; this progressive filling allows the photopolymerisable material to pass through more and more inlet holes as the tubular conduit 75 fills up, with the consequent passage of photopolymerisable material in the container 12 of better and more widespread distribution compared to what has been achieved with the known type inlet mouths with a single hole.

The second wall 25 of the container 12 is shaped in such a way as to direct the photopolymerisable material which encounters it towards the outlet mouth 17. In particular, in the present embodiment, obviously to be understood as a non-limiting example of the invention, the outlet mouth 17 is defined near a side wall 27 of the container 12, and the second wall 25 is inclined to descend towards the outlet mouth 17 starting from the opposite side wall 26.

The operation of the cartridge 10 according to the invention is described below. Preferably, this cartridge 10 is designed to be set up on a stereolithographic machine, not illustrated for purposes of simplicity, so that the first walls 24 and 32 are higher than the second walls 25 and 33.

In particular, this cartridge 10 according to the invention is adapted to being positioned on the stereolithographic machine with an inclination greater than or equal to 20° with respect to a horizontal reference plane, and less than 90°, or rather nearing verticality.

Figure 2:
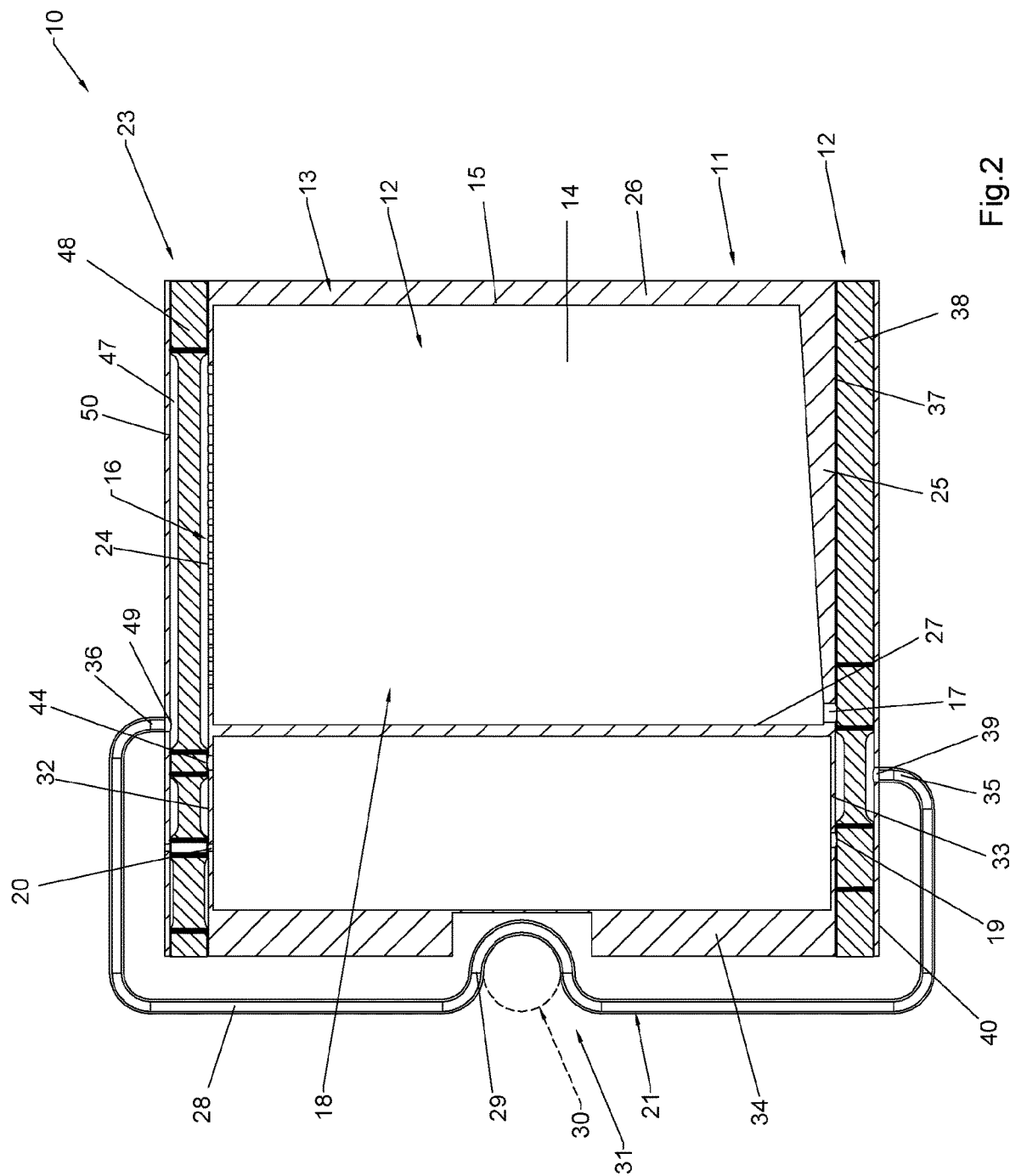
FIG. 2 is a schematic plan view of a cartridge according to the invention in a first use configuration.
Figure 3:
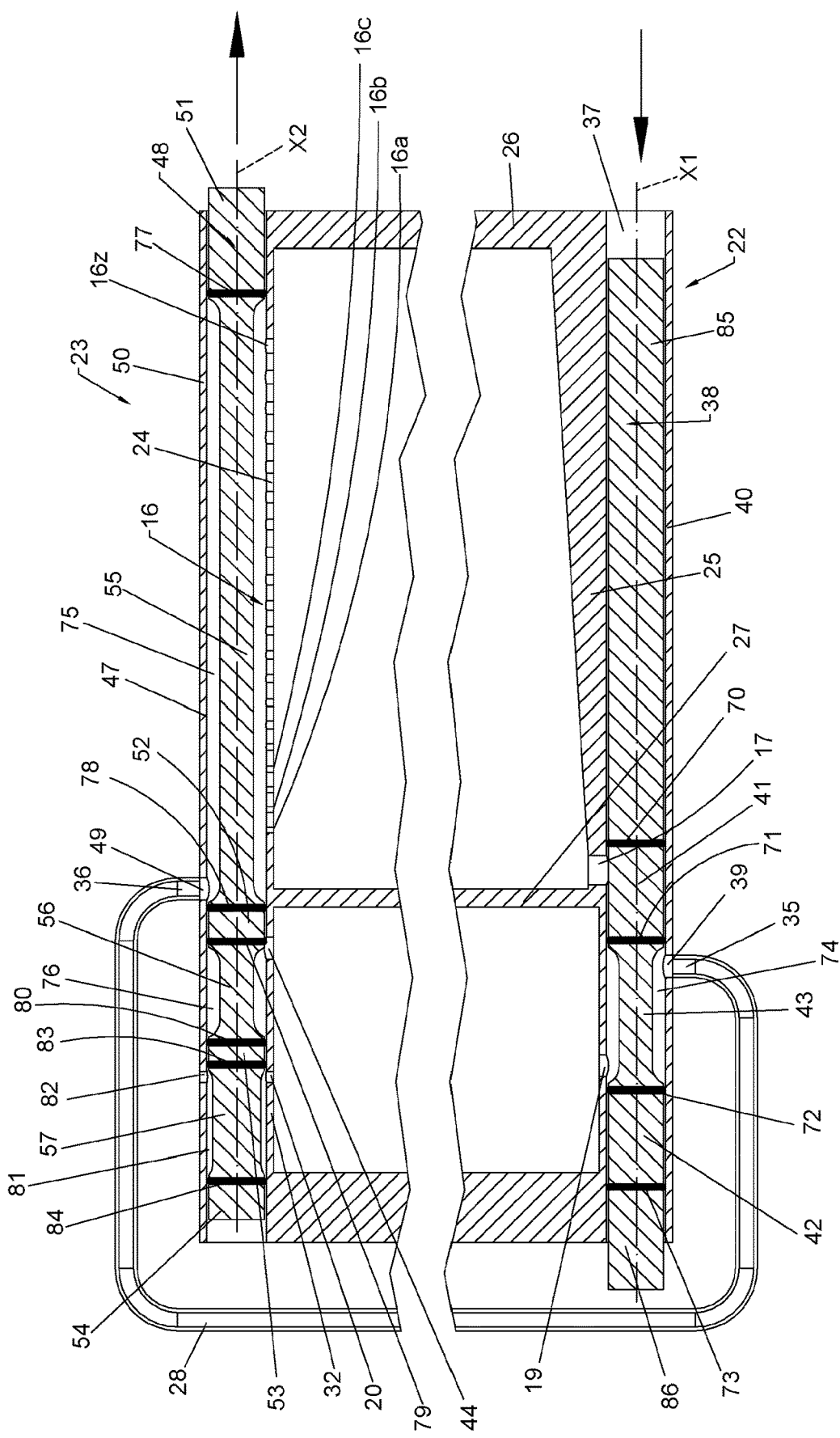
FIG. 3 is a schematic plan view of a cartridge according to the invention in a second use configuration.

FIG. 2 shows the first use configuration of the cartridge 10.

In this first use configuration, to prevent the passage of photopolymerisable material between the container 12 and the tank 18:
  the first valve 22 is in its first configuration, simultaneously closing the transit opening 19 of the tank 18 and the outlet mouth 17 of the container 12 for the first use configuration of the cartridge 10;
  the second valve 23 is in its first configuration, simultaneously closing the air passage opening 20 and the auxiliary opening 44 of the tank 18.

In this first use configuration of the cartridge 10, the photopolymerisable material is closed inside the tank 18 and the photopolymerisable material possibly present in the container 12 is held in the same container 12.

In this first use configuration of the cartridge 10, the photopolymerisable material is substantially sealed closed in the tank 18 since all the openings 19, 20 and 44 of the latter are completely blocked; this first use configuration therefore lends itself to the shipping and transport phases of the cartridge 10. FIG. 3 shows the second use configuration of the cartridge 10.

In this second use configuration, to allow the passage of photopolymerisable material between the container 18 and the tank 12:
  the first valve 22 is in its second configuration, connecting the first end 35 of the shaped tube 28 of the circulation means 21 and the transit opening 19 of the tank 18, with the simultaneous closing of the outlet mouth 17 of the container 12;
  the second valve 23 is in its second configuration, connecting the second end 36 of the shaped tube 28 of the circulation means 21 and the inlet mouth 16 of the container 12, with the simultaneous opening of the air passage opening 20 of the tank 18, and impeding the passage of photopolymerisable material from the second end 36 to the auxiliary opening 44.

In this second use configuration of the cartridge 10, the diffuse distribution of the photopolymerisable material in the container 12 is allowed through the row of inlet holes 16a, 16b, 16c, 16z of the inlet mouth 16.

The opening of the air passage opening 20, and obviously of the external air passage hole 82, allows the emptying of the tank 18, avoiding the 'air pocket' effect.

Figure 4:
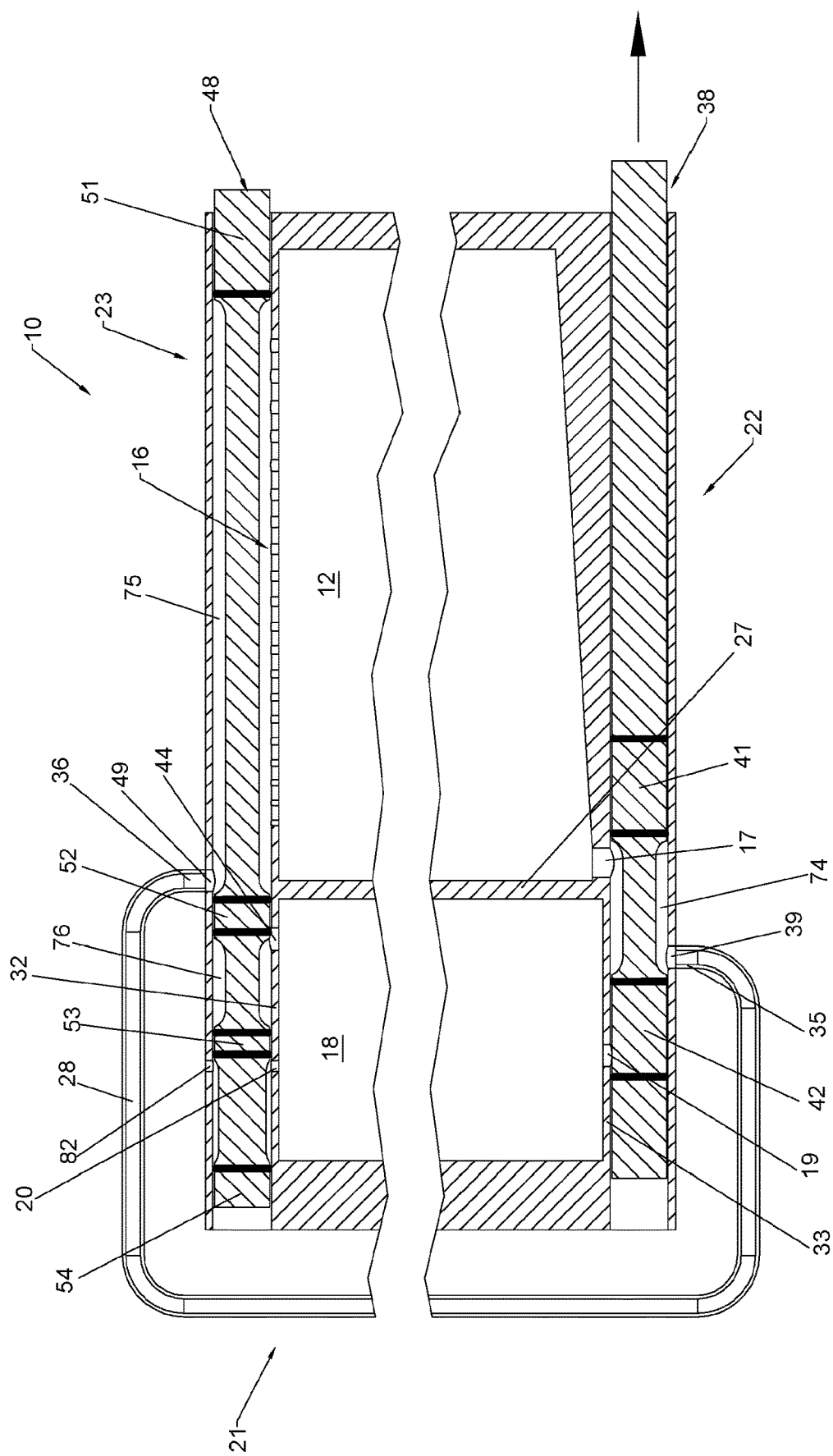
FIG. 4 is a schematic plan view of a cartridge according to the invention in a third use configuration.

FIG. 4 shows the third use configuration of the cartridge 10.

In this third use configuration of circulation for the photopolymerisable material:
  the first valve 22 is in its third configuration, connecting the first end 35 of the shaped tube 28 of the circulation means 21 and the outlet mouth 17 of the container 12, with the simultaneous closing of the transit opening 19 of the tank 18, for the third use configuration of the cartridge 10;
  the second valve 23 is in its second configuration, as described above.

In this third use configuration of the cartridge 10, the recirculation of the photopolymerisable material from the outlet mouth 17 directly to the inlet mouth 16 is allowed.

The cartridge 10, or the stereolithographic machine in which the cartridge is mounted, comprises level sensor means for monitoring the recirculation of the photopolymerisable material, so as to detect a possible lowering of the photopolymerisable material level below a threshold which requires refilling the photopolymerisable material in the container 12.

The level signal detected by the level sensor means is adapted, via an electronic control and management unit of the stereolithographic machine, to operate the first valve 22 in order to bring the cartridge 10 to its second use configuration, thus determining a transfer of photopolymerisable material from the tank 18 to the container 12 until the optimal level of photopolymerisable material in the container 12 is restored.

Figure 5:
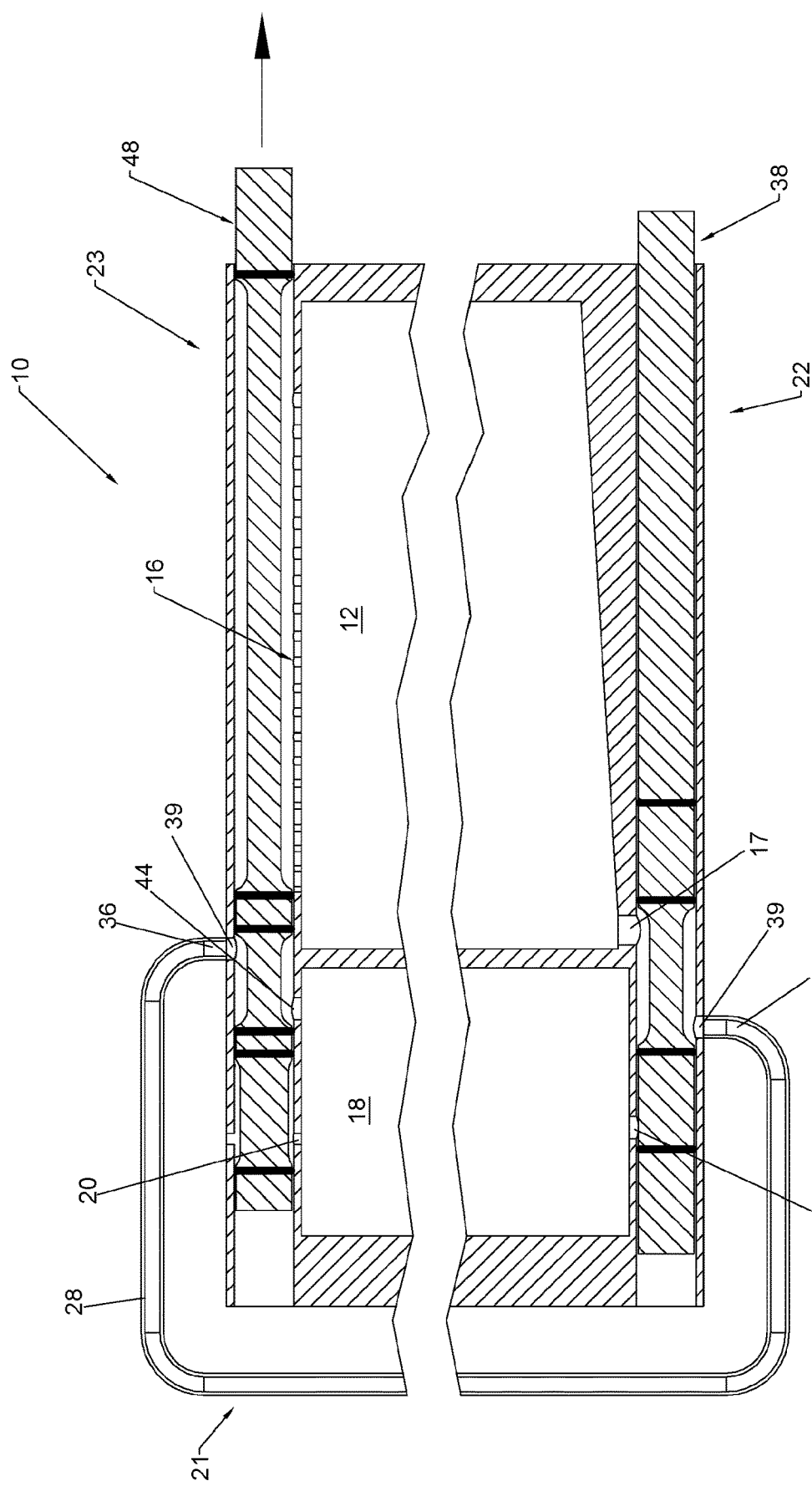
FIG. 5 is a schematic plan view of a cartridge according to the invention in a fourth use configuration.

FIG. 5 shows the fourth use configuration of the cartridge 10.

In this fourth use configuration allowing the passage of photopolymerisable material from the container 12 towards the tank 18:

the first valve 22 is in its second configuration, as described above;
the third valve 23 is in its third configuration, connecting the second end 36 of the shaped tube 28 of the circulation means 21 and the auxiliary opening 44 of the tank 18, with the simultaneous opening of the air passage opening 20 and the respective external air passage hole 82, and the simultaneous closing of the inlet mouth 16 of the container 12.

In this fourth use configuration of the cartridge 10, the first 22 and second 23 valves assume respective configurations such as to allow the recovery of photopolymerisable material from the outlet mouth 17 of the container 12 for its reintroduction into the tank 18 through the auxiliary opening 44.

In doing so, the unused photopolymerisable material is returned to the optimal storage conditions in the tank 18.

In the refilling phase of the tank 18, the air passage opening 20 is open to prevent the formation of overpressure inside the same tank 18.

Once all the photopolymerisable material has been recovered, the first 22 and second 23 valves are actuated to return the cartridge 10 to its first use configuration.

A cartridge as described above is to be understood as included in the invention, whose tank 18 does not have an auxiliary opening 44 for the reintroduction of the photopolymerisable material.

It is therefore to be understood that a cartridge 10 is included in the invention wherein the valve means 22 and 23 are configured for the implementation of the first three use configurations of the cartridge 10 and not also for the implementation of the fourth use configuration of the same cartridge 10.

A variant of this cartridge 10 is to be understood as included in the invention, not shown for purposes of simplicity, whose tank 18 does not have an auxiliary opening 44 for the reintroduction of the photopolymerisable material, and whose valve means 22 and 23 are configured to allow the reintroduction of the photopolymerisable material from the container 12 to the tank 18 through the same transit opening 19.

It is therefore to be understood that a cartridge 10 is included in the invention whose valve means 22 and 23 are configured to allow the reintroduction of the photopolymerisable material from the container 12 to the tank 18 by passing the photopolymerisable material from the outlet mouth 17 of the container 12 directly to the transit opening 19 of the tank 18.

It is also therefore to be understood that a cartridge 10 is included in the invention whose valve means 22 and 23 are configured to allow the reintroduction of the photopolymerisable material from the container 12 to the tank 18 by passing the photopolymerisable material from the inlet mouth 16 of the container 12 towards the transit opening 19 of the tank 18.

It has in practice been established that the invention achieves the intended task and objects.

In particular, a compact cartridge has been developed with the invention which is simpler to manufacture and assemble with respect to the cartridges of a known type, thanks to the valve means which allow the use of a single pumping system, for example a peristaltic pumping system, to create both an optimal conservation phase of the photopolymerisable material, a refilling phase of the moulding container and possible refilling phases of the same container, a recirculation phase of the photopolymerisable material and a reintroduction phase of the unused photopolymerisable material from the container to the tank.

Moreover, a cartridge has been developed with the invention which allows for better preservation of the unused photopolymerisable material.

Moreover, a cartridge has been developed with the invention which can be used on stereolithography machines with an inclined tank of a known type.

The invention thus conceived is susceptible to many modifications and variants, all falling within the same inventive concept; furthermore, all details can be replaced by equivalent technical elements.

In practice, any components and materials can be used according to requirements and the prior art, as long as they are compatible with the specific use, the dimensions and the contingent shapes.

Where the characteristics and techniques mentioned in any claim are followed by reference signs, such reference signs should be intended as having been added for the sole purpose of increasing the intelligibility of the claims and consequently such reference signs have no limiting effect on the interpretation of each element identified by way of example by such reference signs.

The invention claimed is:

1. Cartridge (10) for a stereolithography machine, comprising:
a box-like body (11) comprising in turn:
a container (12), delimited by containment walls (13), having a bottom (14), at least a part of which is transparent, and an opposite access opening (15) adapted to allow access inside said container (12), an inlet mouth (16), for the introduction of a photopolymerisable material, and an outlet mouth (17) for the release of said photopolymerisable material from said container (12);
at least one tank (18) for a photopolymerisable material, comprising a transit opening (19) for said photopolymerisable material and an air passage opening (20) communicating with the environment;
and comprising:
circulation means (21), for the circulation of a photopolymerisable material between said outlet mouth (17) and said inlet mouth (16) of said container (12),
wherein between said circulation means (21) and said inlet (16) and outlet (17) mouths, and between said circulation means (21) and said transit (19) and air passage (20)

openings, valve means (22, 23) are interposed and configured to alternatively allow the following use configurations of said cartridge (10):
- a first configuration, preventing the passage of photopolymerisable material between said container (12) and said tank (18);
- a second configuration, allowing the passage of photopolymerisable material between said tank (18) and said container (12);
- a third configuration, of circulation for said photopolymerisable material, allowing the passage of photopolymerisable material between said outlet mouth (17) of said container (12) and said inlet mouth (16) of the same said container (12).

2. The cartridge according to claim 1, wherein said valve means (22, 23) are configured to allow:
- a second configuration allowing the passage of photopolymerisable material from the tank (18) towards the container (12);
- a third configuration allowing the passage of photopolymerisable material from the outlet mouth (17) of the container (12) towards the inlet mouth (16) of the same container (12).

3. The cartridge according to claim 1, wherein said valve means (22, 23) are configured to allow a fourth use configuration of said cartridge (10), allowing the passage of photopolymerisable material from the container (12) towards the tank (18).

4. The cartridge according to claim 1, wherein said containment walls (13) of the container (12) comprise a first wall (24), on which said inlet mouth (16) is defined, an opposite second wall (25), on which said outlet mouth (17) is defined, and two side walls (26, 27).

5. The cartridge according to claim 1, wherein said tank (18) comprises a first wall (32), on which said air passage opening (20) is defined, an opposite second wall (33), on which said transit opening (19) is defined, and two side walls (34, 27).

6. The cartridge according to claim 1, wherein said circulation means (21) comprise a shaped tube (28), a section (29) thereof is configured to surround at least in part a compression rotor (30), defining with it a peristaltic pumping system (31), said shaped tube (28) having a first end (35) and a second opposite end (36).

7. The cartridge according to claim 1, wherein said valve means (22, 23) comprise a first valve (22) configured to alternatively determine the following configurations:
- a first configuration of said first valve (22), for the simultaneous closing of said transit opening (19) of the tank (18) and of said outlet mouth (17) of the container (12), for said first use configuration of the cartridge (10);
- a second configuration of said first valve (22), connecting the first end (35) of said shaped tube (28) of the circulation means (21) and said transit opening (19) of said tank (18), with the simultaneous closing of said outlet mouth (17) of the container (12), for said second use configuration of the cartridge (10);
- a third configuration of the first valve (22), connecting said first end (35) of said shaped tube (28) of the circulation means (21) and said outlet mouth (17) of said container (12), with the simultaneous closing of said transit opening (19) of said tank (18), for said third use configuration of the cartridge (10).

8. The cartridge according to claim 7, wherein said first valve (22) is configured in such a way that its third configuration, connecting said first end (35) of the shaped tube (28) of the circulation means (21) and said outlet mouth (17) of the container (12), with the simultaneous closing of the transit opening (19) of the tank (18), cooperates in said fourth use configuration of said cartridge (10).

9. The cartridge according to claim 7, wherein said first valve (22) consists of a slide-type valve.

10. The cartridge according to claim 9, wherein, said first valve (22) comprises a tubular channel (37) wherein a shaped slider rod (38) slides.

11. The cartridge according to claim 10, wherein said tubular channel (37) is defined inside said same box-like body (11), near said second walls (25, 33).

12. The cartridge according to claim 1, wherein said valve means (22, 23) comprise a second valve (23) configured to alternatively determine the following configurations:
- a first configuration of said second valve (23) for the simultaneous closing of said air passage opening (20) and of an auxiliary opening (44) of the tank (18), for said first use configuration of the cartridge (10);
- a second configuration of said second valve (23) of connection between said second end (36) of the shaped tube (28) of the circulation means (21) and said inlet mouth (16) of the container (12), with the simultaneous opening of said air passage opening (20) of the tank (18), for said second use configuration and for said third use configuration of the cartridge (10).

13. The cartridge according to claim 12, wherein said second valve (23) is configured to determine, alternatively to its first configuration and second configuration, a third configuration of connection of said second end (36) of the shaped tube (28) of the circulation means (21) and said auxiliary opening (44) of the tank (18), with the simultaneous opening of the air passage opening (20) and the simultaneous closing of the inlet mouth (16) of the container (12), cooperating within said fourth use configuration of the cartridge (10).

14. The cartridge according to claim 12, wherein said second valve (23) consists of a slide-type valve.

15. The cartridge according to claim 14, wherein said second valve (23) comprises a tubular channel (47) wherein a shaped slider rod (48) slides.

* * * * *